United States Patent [19]
Svenson

[11] 3,757,593
[45] Sept. 11, 1973

[54] VARIABLE-RATIO BELT-TYPE TRANSMISSION FOR ENGINE-DRIVEN CYCLE, INCORPORATING PEDAL-OPERATED ENGINE STARTING MEANS

[75] Inventor: Bert N. Svenson, Norwalk, Calif.
[73] Assignee: Instrument Systems Corporation, Jericho, N.Y.
[22] Filed: June 7, 1971
[21] Appl. No.: 150,523

[52] U.S. Cl. ...... 74/238.17 A, 74/230.17 E, 74/810, 192/48.92
[51] Int. Cl. .............................................. F16h 9/00
[58] Field of Search ............ 74/230.17 A, 230.17 E, 74/810, 230.17; 192/48.92

[56] References Cited
UNITED STATES PATENTS

| | | | |
|---|---|---|---|
| 2,678,566 | 5/1954 | Oehrli | 74/230.17 E |
| 2,678,117 | 5/1954 | Birbaum | 74/810 |
| 1,180,697 | 4/1916 | Cobb | 74/810 |
| 2,529,919 | 11/1950 | Cunningham | 192/48.92 |
| 2,887,100 | 5/1959 | Papst | 74/810 |
| 2,986,043 | 5/1961 | Jaulmes | 74/230.17 E |
| 3,362,242 | 1/1968 | Watkins | 74/230.17 E |

Primary Examiner—C. J. Husar
Attorney—Robert L. Parker et al.

[57] ABSTRACT

An engine-driven cycle having a variable-ratio belt-type transmission incorporating pedal-operated means for starting the engine. The transmission transmits power from a driving shaft of the engine to a driven shaft of the cycle when the engine is running, and transmits pedal-generated power from the driven shaft to the driving shaft to start the engine when it is not running.

13 Claims, 8 Drawing Figures

Patented Sept. 11, 1973

INVENTOR
BERT N. SVENSON
BY HIS ATTORNEYS
HARRIS, KIECH, RUSSELL & KERN

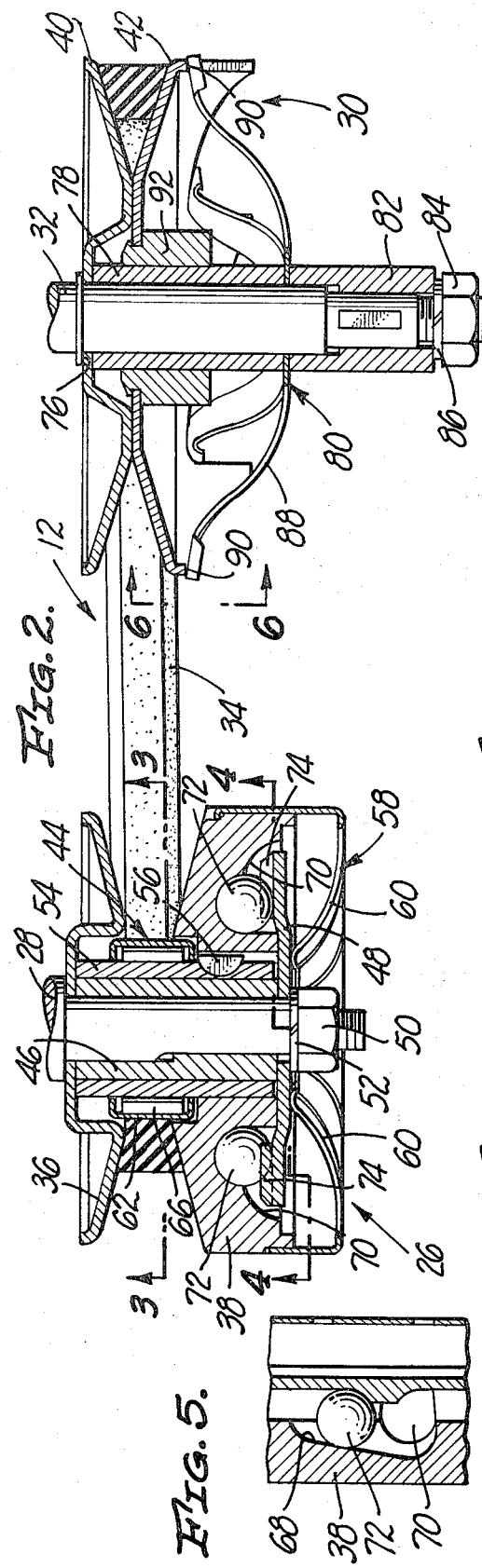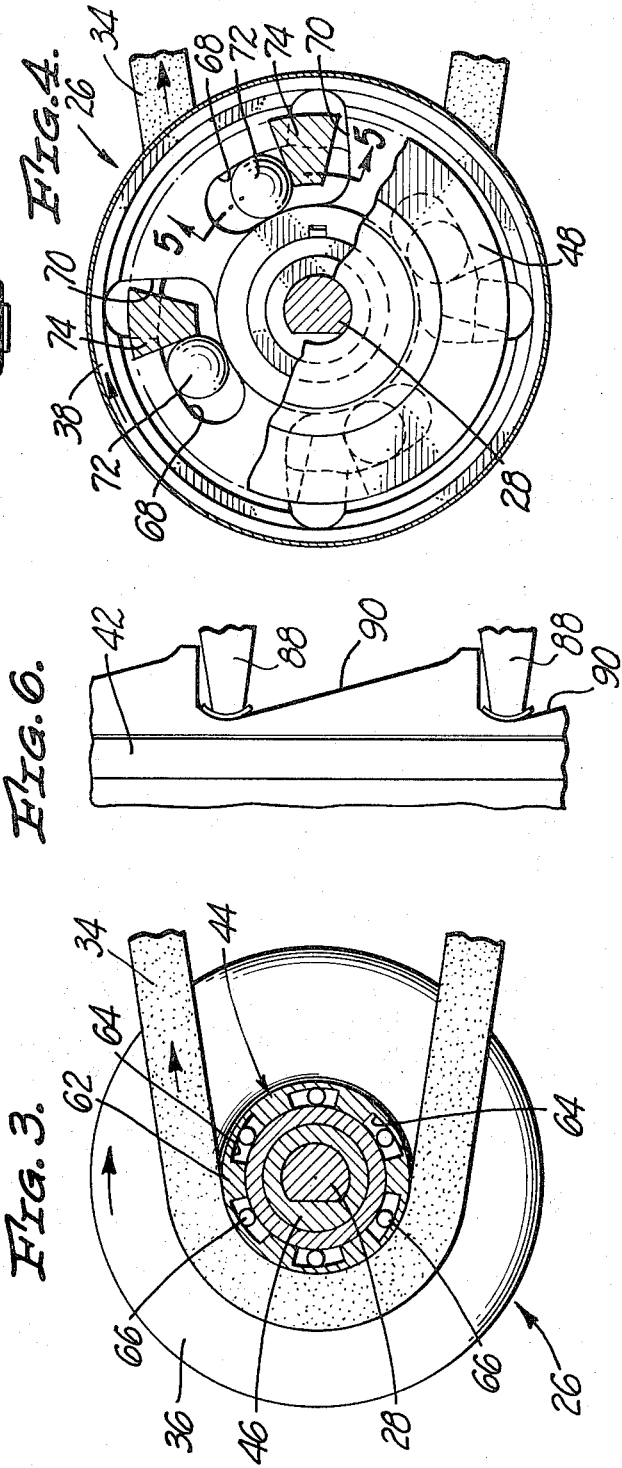

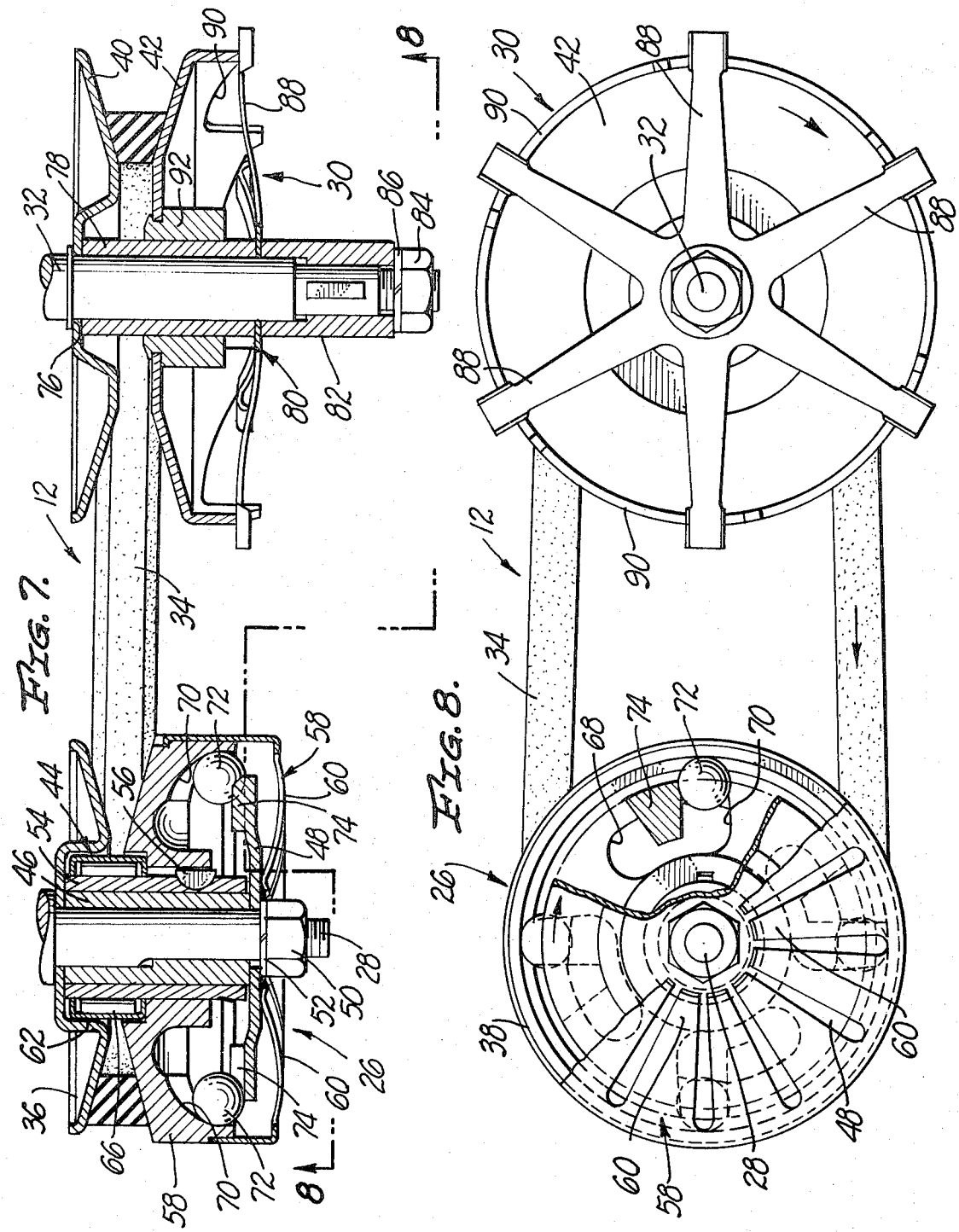

VARIABLE-RATIO BELT-TYPE TRANSMISSION FOR ENGINE-DRIVEN CYCLE, INCORPORATING PEDAL-OPERATED ENGINE STARTING MEANS

BACKGROUND OF INVENTION

The present invention relates in general to a variable-ratio belt-type transmission for transmitting power from a driving shaft of an engine to a driven shaft when the engine is running and for transmitting power from the driven shaft to the driving shaft to start the engine when it is not running. The invention is particularly applicable to, and, for convenience, will be considered in connection with, a pedal-equipped engine-driven cycle wherein pedal-generated power is delivered to the driving shaft for engine starting purposes.

As further background, the variable-ratio belt-type transmission of the invention includes: a variable-pitch-diameter driving pulley on the driving or engine shaft and comprising two coaxial, relatively axially movable, generally frusto-conical driving pulley members; a variable-pitch-diameter driven pulley on the driven shaft and comprising two coaxial, relatively axially movable, generally frustoconical driven pulley members; a V-belt trained around the driving and driven pulleys; overrunning clutch means on the driving shaft between the driving pulley members and engageable by the inner periphery of the belt; the clutch means being engaged when the driven pulley drives the belt, whereby the engine may be started by means of pedal-generated power applied to the driven shaft and delivered to the driving or engine shaft through the driven pulley, the belt and the clutch means; the clutch means being disengaged when the engine is running, whereby power may be transmitted from the driving shaft to the driven shaft through the driving pulley, the belt and the driven pulley; and driving-pulley closing means operable when the clutch means is disengaged, and responsive to the speed of rotation of the driving shaft, for relatively moving the driving pulley members axially toward each other to increase the pitch diameter of the driving pulley, the pitch diameter of the driven pulley decreasing correspondingly.

With the foregoing construction, the engine with which the cycle is equipped may be started initially by pedaling, the pedal-generated power being transmitted to the engine by automatic engagement of the overrunning clutch means in response to power application to the driven shaft. As soon as the engine starts, the overrunning clutch means disengages and power is transmitted from the driving pulley to the driven pulley through the belt in the normal manner for a transmission of this type. The speed-responsive driving-pulley closing means causes the transmission ratio to shift "up" as the engine speed increases.

SUMMARY AND OBJECTS OF INVENTION

The primary object of the invention is to provide a variable-ratio belt-type transmission having the foregoing characteristics wherein the driving pulley is provided with a driving-pulley closing means operable when the overrunning clutch means is engaged during starting of the engine. With this construction, the driving pulley is closed on the belt during starting for efficient transmission of pedal-generated power to the engine.

An object related to the foregoing is to provide a driving-pulley closing means, operable during starting of the engine, which includes: circumferentially extending grooves of circumferentially decreasing depth in one of the driving pulley members; balls in the respective grooves; and means for displacing the balls toward the shallower ends of the grooves to close the driving pulley on the belt.

Another object of the invention is to provide a driving pulley wherein the same balls used to close the driving pulley during starting of the engine are also used to close the driving pulley to shift the transmission ratio up in response to increasing engine speed after starting of the engine, the balls under such conditions being disposed in radial grooves of radially-outwardly-decreasing depth.

Thus, in accordance with the present invention, the same balls are used to close the driving pulley both during starting of the engine and when the engine is running, which is an important feature.

Another important object of the invention is to provide a variable-ratio belt-type transmission of the foregoing nature including torque responsive means for axially separating the driven pulley members to decrease the pitch diameter of the driven pulley in response to increasing speed of or increasing load on the driven shaft, thereby shifting the transmission ratio "down."

The foregoing objects, advantages, features and results of the present invention, together with various other objects, advantages, features and results which will be evident to those skilled in the variable-ratio belt-type transmission art in the light of this disclosure, may be achieved with the exemplary embodiment of the invention illustrated in the accompanying drawings and described in detail hereinafter.

DESCRIPTION OF DRAWINGS

In the drawings:

FIG. 2 is a view similar to FIG. 1, but illustrating the condition of the transmission during pedal-induced starting of the engine;

FIGS. 3 and 4 are sectional views respectively taken as indicated by the arrowed lines 3—3 and 4—4 of FIG. 2;

FIG. 5 is a fragmentary sectional view taken as indicated by the arrowed line 5—5 of FIG. 4;

FIG. 6 is a fragmentary elevational view taken as indicated by the arrowed line 6—6 of FIG. 2;

FIG. 7 is a view similar to FIGS. 1 and 2, but illustrating the condition of the transmission when the engine is running at substantially full speed with substantially maximum torque response from the driven shaft; and FIG. 8 is a view taken as indicated by the arrowed line 8—8 of FIG. 7.

DESCRIPTION OF EXEMPLARY EMBODIMENT OF INVENTION

Figure 1:
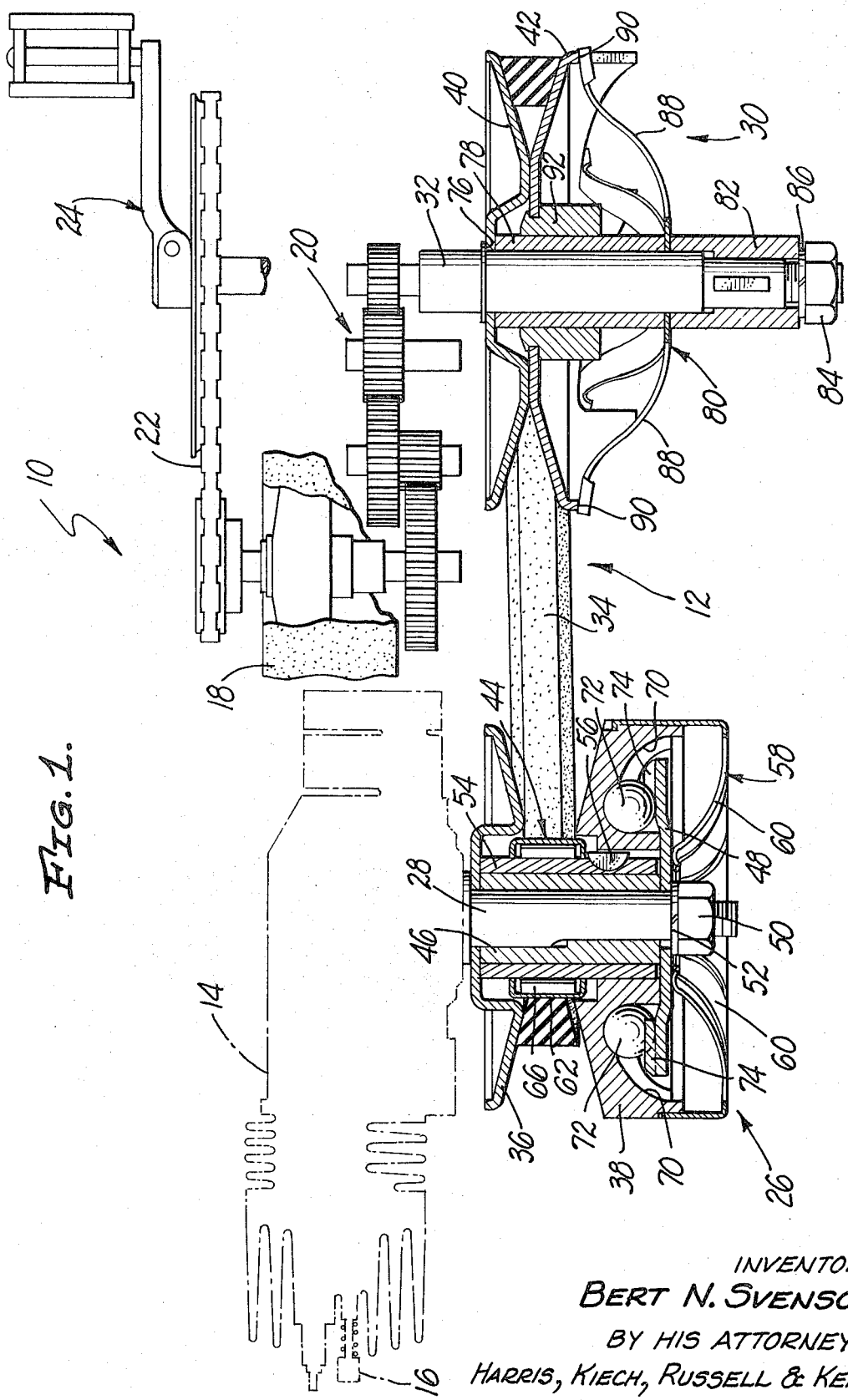
FIG. 1 illustrates the variable-ratio belt-type transmission of the invention as used to interconnect the engine and driven wheel shaft of a pedal-equipped engine-driven cycle, FIG. 1 illustrating the condition of the transmission prior to starting the engine, or with the engine idling.

Referring initially to FIG. 1 of the drawings, illustrated fragmentarily therein is a pedal-equipped engine-driven bicycle 10 provided with a variable-ratio belt-type transmission 12 of the invention, the transmission incorporating a pedal-operated engine starting means as will be described in detail hereinafter.

The bicycle 10 includes an engine 14 which is equipped with a compression release 16 to facilitate cranking of the engine prior to starting. The engine 14 drives a rear wheel 18 of the bicycle 10 through the transmission 12 of the invention and a gear train 20. Also connected to the rear wheel 18 by a chain and sprocket drive 22 is a pedal assembly 24. As will be described in detail hereinafter, the engine 14 may be started by manual power applied to the pedal assembly 24, either with the bicycle 10 in motion, or with the driven wheel 18 thereof supported above ground level by a kick stand, or the like, not shown.

Considering the transmission 12 now in more detail, it includes a driving pulley or driving pulley assembly 26 on a driving shaft 28 of the engine 14, which driving shaft is preferably the crankshaft of the engine. The transmission 12 also includes a driven pulley or driven pulley assembly 30 on a driven shaft 32 which, in the particular construction illustrated, is a shaft carrying one of the gears of the gear train 20. The driven pulley 30 is connected to the driving pulley 26 by a V-belt 34 trained around the two pulleys.

As is conventional in a transmission of this type, the driving pulley 26 includes two coaxial, relatively axially movable, generally frustoconical driving pulley members 36 and 38 which receive the V-belt 34 therebetween. More particularly, the driving pulley member 38 is movable axially toward and away from the driving pulley member 36 to increase and decrease the pitch diameter of the driving pulley 26. Similarly, the driven pulley 30 includes two coaxial, relatively axially movable, generally frustoconical driven pulley members 40 and 42, the driven pulley member 42 being axially movable toward and away from the driven pulley member 40 to increase and decrease the pitch diameter of the driven pulley.

Carried by the engine shaft 28 between the driving pulley members 36 and 38, and engageable by the inner periphery of the V-belt 34, is an overrunning clutch or clutch means 44 which is engaged when the driven pulley 30 drives the belt, and which is disengaged when the driving pulley 26 drives the belt. Thus, the engine 14 may be started by means of pedal-generated power applied to the driven shaft 32 and delivered to the engine shaft 28 through the driven pulley 30, the belt 34, the clutch 44 and, as will be explained hereinafter, the driving pulley 26. Conversely, when the engine is running so that the clutch 44 is disengaged, power is transmitted from the driving shaft 28 to the driven shaft 32 through the driving pulley 26, the belt 34 and the driven pulley 30.

Considering the driving pulley 26 in more detail, the fixed driving pulley member 36 is clamped between an annular shoulder on the engine shaft 28 and a sleeve 46 keyed to the engine shaft. Clamped against the outer end of the sleeve 46 is a disc 48 retained by a nut 50 threaded on the outer end of the engine shaft 28, there being a lock washer 52 between the nut and the disc.

Rotatable on the sleeve 46 is an outer sleeve 54 on which the driving pulley member 38 is axially slidable. Relative rotation between the driving pulley member 38 and the outer sleeve 54 is prevented by a key 56. The movable driving pulley member 38 is biased axially away from the fixed driving pulley member 36, to tend to open the driving pulley 26 and thus reduce its pitch diameter, by a spring means 58 comprising circumferentially-spaced radially-inwardly-extending spring fingers 60 carried by the driving pulley member 38 and bearing against the disc 48.

The overrunning clutch 44 is conventional and, as best shown in FIG. 3, utilizes the sleeve 54 as its inner race. Telescoped over the sleeve 54 is an outer race 62 having circumferentially spaced ramps 64 which circumferentially approach the sleeve 54 in the counter-clockwise direction, as viewed in FIG. 3. The inner periphery of the V-belt 34 engages the outer race 62, when the driving pulley 26 is open. When the V-belt 34 is driven in the clockwise direction, as viewed in FIG. 3, by the driven pulley 30, rollers 66 wedge between the ramps 64 and the sleeve 54 so that the clutch 44 is engaged. Conversely, when the driving shaft 28 provides the power, the clutch 44 is disengaged.

The movable driving pulley member 38 is provided in its outer surface with circumferentially spaced, circumferentially extending grooves 68 of circumferentially decreasing depth, as best shown in FIG. 5 of the drawings. Communicating with the deeper ends of the circumferential grooves 68 are radially extending grooves 70 of radially decreasing depth. As best shown in FIG. 4, each circumferential groove 68 cooperates with the corresponding radial groove 70 to provide a composite groove which is L-shaped and which is deepest at the angle of the L, the depth decreasing circumferentially of the groove 68 and radially of the groove 70 from the angle of the L. Each of L-shaped composite grooves contains a ball 72.

During starting of the engine 14, pedal-generated power is transmitted to the V-belt 34 by the driven pulley 30 and the gear train 20. The V-belt 34 acts on the outer race 62 of the clutch 44 to engage the clutch, thereby angularly displacing the movable driving pulley member 38. Under such conditions, as best shown in FIG. 4, circumferentially spaced lugs 74 on the disc 48 fixed to the engine shaft 28 engage the balls 72 and force them toward the shallower ends of the circumferential grooves 68. This results in closing of the driving pulley 26 on the V-belt 34 to prevent slippage, and also results in torque transmission to the engine shaft 28 to crank the engine, this being done with the compression release 16 activated. When the engine speed is sufficiently high for starting, the compression release 16 is de-activated to enable the engine to start.

After the engine 14 has been started, and is running at idling speed, the engine shaft 28 rotates relative to the movable driving pulley member 38 sufficiently to permit the balls 72 to enter the deepest portions of the composite L-shaped grooves in the movable driving pulley member. This permits the driving pulley 26 to open so that it does not engage the V-belt 34. Also, the overrunning clutch 44 is now disengaged, and merely acts as an idler permitting the engine 14 to run without transmitting any power to the driven pulley 30. It will be noted that when the engine 14 is running, the lugs 74 on the disc 48 engage the balls 72 to drive the movable driving pulley member 38, this condition being shown in FIG. 8. If the engine speed is now increased substantially above idling, centrifugal force urges the balls 72 radially outwardly in the grooves 70 to close the driving pulley 26 and thus increase its pitch diameter, the pitch diameter of the driven pulley 30 decreasing correspondingly. Thus, the drive ratio of the transmission 12 is shifted up.

Turning now to a more detailed consideration of the driven pulley 30, the fixed driven pulley member 40 is clamped against an annular shoulder 76 on the driven shaft 32 by a sleeve 78 on the driven shaft. A spring assembly 80 is clamped against the outer end of the sleeve 78 by an outer sleeve 82 keyed to the driven shaft 32 and retained by a nut 84 and lock washer 86. The spring assembly 80 comprises circumferentially spaced, radial arms 88 the outer ends of which bear against circumferentially spaced cams or ramps 90 on the movable driven pulley member 42, which is rotatably mounted on the sleeve 78 by means of a central hub 92.

With the foregoing construction, when the bicycle 10 is being propelled by the engine 14, an increase in the load on the driven shaft 32, due, for example, to an upgrade, results in rotation of the movable driven pulley member 42 relative to the fixed driven pulley member 40, as the torque overcomes the thrust of the torque-sensing spring assembly 80. As the result, the pitch diameter of the driven pulley 30 is reduced to shift the drive ratio down in response to the increased load.

SUMMARY OF OPERATION

The operation of the transmission 12 has largely been explained in the course of describing its structure. Consequently, the operation will merely be summarized briefly in this section of the specification.

FIG. 1 of the drawings illustrates the condition of the transmission prior to starting the engine, or with the engine idling. Under such circumstances, the driving pulley 26 is open so that it does not engage the V-belt 34. If the engine is idling, the clutch 44 is disengaged and merely acts as an idler for the V-belt 34, without transmitting any power thereto.

During starting of the engine 14, the conditions shown in FIGS. 2 to 6 prevail. The driven pulley 30 is closed by the spring assembly 80 and pedal-generated power delivered to the driven pulley is transmitted by the V-belt 34 to the driving pulley 26. Movement of belt 34 causes clutch 44 to engage and drive collar 54 and hence move pulley member 38, thereby closing pulley 26. The driving pulley 26 is closed slightly to grip the V-belt 34 by the action of balls 72 in the circumferential grooves 68.

FIGS. 7 and 8 of the drawings illustrate conditions prevailing when the engine 14 is running at substantially full speed with substantially maximum torque response from the driven shaft. Under such conditions, the balls 72 have partially closed the driving pulley 26 and the torque responsive driven pulley 30 has opened partially in opposition to the action of the torque sensing spring assembly 80.

Although an exemplary embodiment of the invention has been disclosed for purposes of illustration, it will be understood that various changes, modifications, and substitutions may be incorporated in such embodiment without departing from the spirit of the invention as defined by the claims which follow.

I claim as my invention:

1. In a variable-ratio belt-type transmission for transmitting power from a driving shaft of an engine to a driven shaft when the engine is running and for transmitting power from said driven shaft to said driving shaft to start the engine when it is not running, the combination of:

a. a variable-pitch-diameter driving pulley for mounting on such driving shaft and comprising two coaxial, relatively axially movable, generally frusto-conical driving pulley members;

b. a variable-pitch-diameter driven pulley for mounting on such driven shaft and comprising two coaxial, relatively axially movable, generally frusto-conical driven pulley members;

c. a V-belt trained around said driving and driven pulleys, the driving pulley members being normally positioned to a non-belt-engaging position;

d. overrunning clutch means positioned in between and coupled to said driving pulley members and engageable by the inner periphery of said belt;

e. said clutch means being adapted to be engaged and thereby couple said driving pulley members to said belt when said driven pulley drives said belt, whereby the engine may be started by means of power applied to such driven shaft and delivered to such driving shaft through said driven pulley, said belt and said clutch means;

f. said clutch means being adapted to be disengaged and thereby uncouple said driving pulley from said belt when the engine is running and said driving pulley drives said belt;

g. first driving-pulley closing means operable when said clutch means is engaged and responsive to torque applied to said clutch means by said belt for relatively moving said driving pulley members axially toward each other into a belt engaging position; and h. second driving-pulley closing means operable when said clutch means is disengaged and responsive to centrifugal force due to rotation of said driving pulley for relatively moving said driving pulley members axially toward each other into a belt-engaging position and to vary the pitch diameter belt-engaging position thereof.

2. A variable-ratio belt-type transmission as defined in claim 1 wherein said first driving-pulley closing means includes:

a. circumferentially extending grooves of circumferentially decreasing depth in one of said driving pulley members;

b. balls in each said grooves; and c. means for displacing said balls toward the shallower ends of said grooves.

3. A variable-ratio belt-type transmission according to claim 2 wherein said second driving-pulley closing means includes:

a. radially extending grooves of radially-outwardly-decreasing depth in one of said driving pulley members;

b. the deeper ends of said radially extending grooves respectively communicating with the deeper ends of said circumferentially extending grooves; and c. means for displacing said balls into the deeper ends of said circumferentially extending grooves so that they may move radially outwardly in said radially extending grooves under the influence of centrifugal force.

4. A variable-ratio belt-type transmission as set forth in claim 1 including torque responsive means for axially separating said driven pulley members to decrease the pitch diameter of said driven pulley.

5. In a variable-ratio belt-type transmission according to claim 1 comprising spring means for normally urging said driving pulley members apart.

6. In a variable-ratio belt-type transmission for transmitting power from a driving shaft of an engine to a driven shaft when the engine is running and for transmitting power from said driven shaft to said driving shaft to start the engine when it is not running, the combination of:
   a. a variable-pitch-diameter driving pulley for mounting on such driving shaft and comprising two coaxial, relatively axially movable, generally frusto-conical driving pulley members;
   b. a variable-pitch-diameter driven pulley for mounting on such driven shaft and comprising two coaxial, relatively axially movable, generally frusto-conical driven pulley members;
   c. said driving and driven pulleys being adapted to receive a V-belt trained therebetween, the driving pulley members being normally positioned to a non-belt-engaging position;
   d. overrunning clutch means positioned in between and coupled to said driving pulley members and engageable by the inner periphery of such belt;
   e. said clutch means being adapted to be engaged and thereby couple said driving pulley members to such belt when said driven pulley drives such belt, whereby the engine may be started by means of power applied to such driven shaft and delivered to such driving shaft through said driven pulley, such belt and said clutch means;
   f. said clutch means being adapted to be disengaged and thereby uncouple said driving pulley from such belt when the engine is running and said driving pulley drives such belt;
   g. first driving-pulley closing means operable when said clutch means is engaged and responsive to torque applied to said clutch means by such belt for relatively moving said driving pulley members axially toward each other into a belt-engaging position; and
   h. second driving-pulley closing means operable when said clutch means is disengaged and responsive to centrifugal force caused by rotation of said driving pulley for relatively moving said driving pulley members axially toward each other into a belt-engaging position and to vary the pitch diameter belt-engaging position thereof.

7. A variable-ratio belt-type transmission as defined in claim 6 wherein said first driving-pulley closing means includes:
   a. circumferentially extending grooves of circumferentially decreasing depth in one of said driving pulley members;
   b. balls in each said grooves; and
   c. means for displacing said balls toward the shallower ends of said grooves.

8. A variable-ratio belt-type transmission according to claim 7 wherein said second driving-pulley closing means includes:
   a. radially extending grooves or radially-outwardly-decreasing depth in one of said driving pulley members;
   b. the deeper ends of said radially extending grooves respectively communicating with the deeper ends of said circumferentially extending grooves; and
   c. means for displacing said balls into the deeper ends of said circumferentially extending grooves so that they may move radially outwardly in said radially extending grooves under the influence of centrifugal force.

9. In a variable-ratio belt-type transmission according to claim 6 comprising spring means for normally urging said driving pulley members apart.

10. A variable-pitch-diameter driving pulley for mounting on a driving shaft and comprising:
   a. two coaxial, relatively axially movable, generally frusto-conical driving pulley members;
   b. the driving pulley members being normally positioned to a non-belt-engaging position and adapted to receive a V-belt therebetweeen;
   c. overrunning clutch means positioned in between and coupled to said driving pulley members and engageable by the inner periphery of such belt;
   d. said clutch means being adapted to be engaged and thereby couple such belt to said driving pulley members when driven by such belt, whereby the engine may be started by means of power applied to such belt and said clutch means;
   e. said clutch means being adapted to be disengaged and thereby uncouple such belt from said driving pulley when said driving pulley drives such belt;
   f. first driving-pulley closing means operable when said clutch means is engaged and responsive to torque applied to said clutch means by such belt for relatively moving said driving pulley members axially toward each other into a belt-engaging position; and
   g. second driving-pulley closing means operable when said clutch means is disengaged and responsive to centrifugal force caused by rotation of said driving pulley for relatively moving said driving pulley members axially toward each other into a belt-engaging position and to vary the pitch diameter belt-engaging position thereof.

11. A variable-ratio belt-type transmission as defined in claim 10 wherein said first driving-pulley closing means includes:
   a. circumferentially extending grooves of circumferentially decreasing depth in one of said driving pulley members;
   b. balls in each said grooves; and
   c. means for displacing said balls toward the shallower ends of said grooves.

12. A variable-ratio belt-type transmission according to claim 11 wherein said second driving-pulley closing means includes:
   a. radially extending grooves of radially-outwardly-decreasing depth in one of said driving pulley members;
   b. the deeper ends of said radially extending grooves respectively communicating with the deeper ends of said circumferentially extending grooves; and
   c. means for displacing said balls into the deeper ends of said circumferentially extending grooves so that they may move radially outwardly in said radially extending grooves under the influence of centrifugal force.

13. In a variable-ratio belt-type transmission according to claim 10 comprising spring means for normally urging said driving pulley members apart.

* * * * *

UNITED STATES PATENT OFFICE
CERTIFICATE OF CORRECTION

Patent No. 3,757,593     Dated Sept. 11, 1973

Inventor(s) Bert N. Svenson

It is certified that error appears in the above-identified patent and that said Letters Patent are hereby corrected as shown below:

Col. 7, line 52 "balls" should read --a ball; line 58, "or" should read --of--.
Col. 8, line 44 "balls" should read --a ball.

Signed and sealed this 19th day of February 1974.

(SEAL)
Attest:

EDWARD M. FLETCHER, JR.
Attesting Officer

C. MARSHALL DANN
Commissioner of Patents